April 8, 1924.                    L. H. BACHER                    1,489,970
                               DIRIGIBLE HEADLIGHT
                             Filed May 26, 1923            2 Sheets-Sheet 1

Inventor
Lewis H. Bacher
By A. W. Bates
ATTY.

April 8, 1924.
L. H. BACHER
1,489,970
DIRIGIBLE HEADLIGHT
Filed May 26, 1923
2 Sheets-Sheet 2
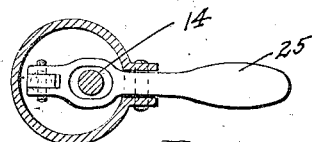
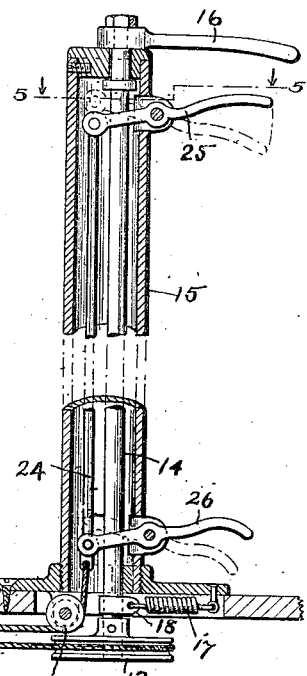
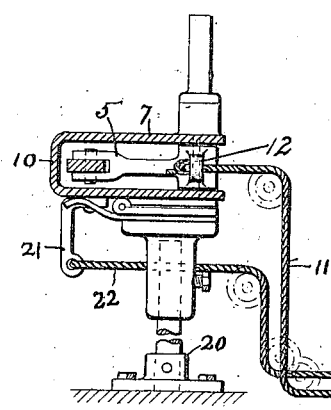
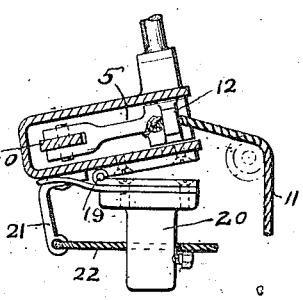
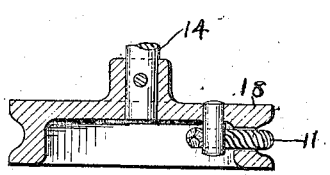
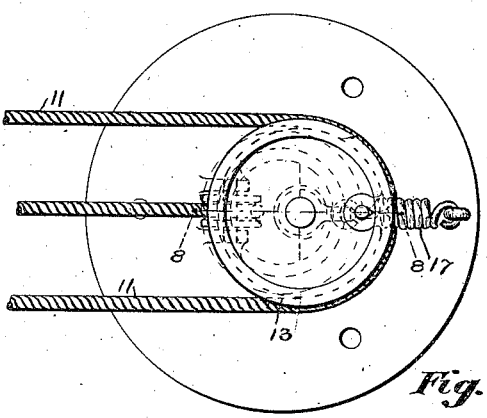
Inventor.
Lewis H. Bacher
By
J. W. Bates.
Atty.

Patented Apr. 8, 1924.

1,489,970

UNITED STATES PATENT OFFICE.

LEWIS H. BACHER, OF BATH, MAINE.

DIRIGIBLE HEADLIGHT.

Application filed May 26, 1923. Serial No. 641,554.

*To all whom it may concern:*

Be it known that I, LEWIS H. BACHER, a citizen of the United States, residing at Bath, in the county of Sagadahoc and State of Maine, have invented certain new and useful Improvements in Dirigible Headlights, of which the following is a specification.

My invention relates to dirigible head lights for motor vehicles and particularly to those adapted to swing laterally and vertically.

The object of the invention is to construct such a headlight in pairs so that as to mount them cheaply and easily and to provide them with a hand and foot control which are always within easy reach and under perfect control.

I have illustrated my invention by means of the accompanying drawing in which:—

Figure 1:
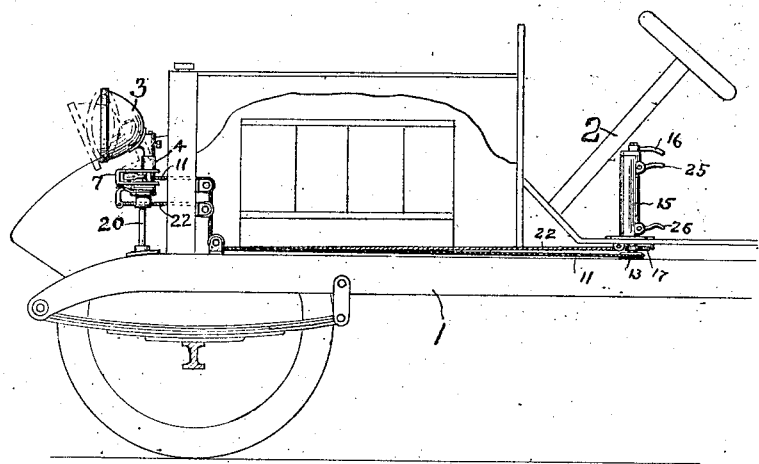
Figure 2:
Figure 3:
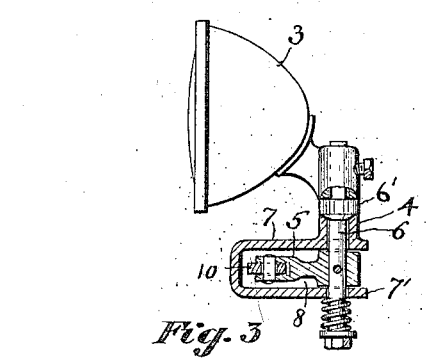

Fig. 1 is a side view of the forward portion of an automobile,

Fig. 2 is a plan of the location and operative mechanism of the headlights of the automobile with parts broken away, Fig. 3 is a sectional view taken on the line 3—3 of Fig. 2, Fig. 4 is a section taken on the line 4—4 of Fig. 2, Fig. 5 is a section on the line 5—5 of Fig. 4, Fig. 6 is the same view as that at the left hand side of Fig. 4 showing the supporting strip in tilted position, Fig. 7 is a plan view taken on the right hand side of Fig. 4 looking upward at the pulley and adacent parts and, Fig. 8 is a vertical section through said pulley, on line 8—8 of Fig. 7.

Referring to the drawing, 1 represents the automobile frame, 2 the steering posts and 3 one of the dirigible headlights.

The headlights, preferably two in number, are mounted on the two ends of a strip extending laterally across the car and so connected as to turn sidewise in both directions and to be tilted forwardly and downwardly to cast beams of light in the downwardly inclining surface, as a hill.

As here shown, the headlights are mounted on a strip extending across the car and formed preferably of thin metal folded in the center to form an upper limb 7 and a lower limb 7', leaving a flat space 8 between the two for the location of the necessary connections by which the headlight is turned.

The headlight is secured to the upper end of a post 6 having an enlarged bearing 6', the post being pivoted in an upright standard 4 formed as here shown, as a part of the upper limb 7 of the supporting strip. The rotation of the post 6 acts to point the light 3 in different directions and this rotation is brought about by arms 5 secured to posts 6 and swinging within the space 8 between the two limbs. It is to be understood that two similar lights are mounted one on each end of the strip although but one is shown in the drawing.

The two lights are connected so that their movements are alike by means of a reach rod 10 extending through the space 8 from one headlight to the other.

The position of the lights is governed by the position of the reach rod 10 which is moved longitudinally inside the space 8 by two bell crank levers 30 and 31 connected to the pulley 13 by the flexible cord or other similar member 11. The two ends of the cord connect one to the lever 30 and the other to the lever 31, both of said levers being connected to the reach rod 10 to move the same longitudinally of the strip. The cord 11 engages the pulley 13 and the position of the reach rod and the lights is governed by the swinging of the operating lever 16, the rotation of the shaft 14 and of the pulley 13.

The strip is so mounted that its rear side may be tilted upwardly so that the light from the headlight will be thrown downwardly as shown in Fig. 6. The strip is pivoted by means of a pivot 19 on the upper end of a post 20 mounted on the frame of the machine.

Extending downwardly from the under side of the strip is the arm 21 to which is secured a flexible member, as the cord 22, which passing over suitable guides, one of which 23 is located at the bottom of the post 15 connecting there with the vertical rod 24 extending vertically up through the post.

The rod 24 is connected to be moved vertically by a hand lever 25 pivoted to the upper end of the rod 24 and to the post with a similar foot lever 26 pivoted to the lower end of the rod 24.

The depression of either of these levers 25 and 26 will exert an upward pull on the cord 22 and act to pull back the arm 21 and tilt the supporting strip upwardly and forwardly.

It is to be understood that one end of the cord 11 is connected to the pulley 13 and also connected by the other end of the cord to the arm 12.

Thus the arm 12 forms with the arm 5 a bell crank lever connected with the reach-rod 10.

Each lamp has a similar lever at the base of its pivotal connection, the arms 5 of which lever connecting with the reach-rod 10.

Thus longitudinal movement of the reach-rod turns the light laterally from side to side.

By these connections, it will be seen that the swinging of the lever 16 will act to swing the two headlights laterally for use in turning into a side street and for throwing the lights laterally as may be desired while the depression of the levers 25 and 26, one by hand and the other by the foot, the strip and the two headlights are tilted forwardly and downwardly for use in going over the top of a hill and throwing the lights in a forwardly and downwardly direction.

Dirigible automobile headlights mounted and operated as herein shown, may be easily and quickly applied and conveniently operated.

I claim:—

In a pair of dirigible headlights for motor vehicles, the combination of a supporting strip for said headlights hinged for tilting vertically and forwardly, said strip being U-shaped in cross section with an intervening space between the two halves, Hinges for tiltably supporting said strip, lamp standards pivoted to said strip, an arm projecting downwardly from the strip, arms for rotating the standards, cords for turning said last named arms to rotate the standards and passing longitudinally through said space, a hollow operating post, a shaft therein, a lever for rotating the same, a pulley on said shaft upon which said cord is wound whereby the operation of said lever turns said lights laterally, and means within the hollow post and connected with the downwardly projecting arm to tilt the lamp standards.

LEWIS H. BACHER.